United States Patent [19]
Miyazaki et al.

[11] Patent Number: 6,051,338
[45] Date of Patent: Apr. 18, 2000

[54] ELECTRODE PLATE FOR SECONDARY BATTERY WITH NONAQUEOUS ELECTROLYTE

[75] Inventors: Yuichi Miyazaki; Shin Miyanowaki; Hidetake Takahara, all of Tokyo-to, Japan

[73] Assignee: Dai Nippon Printing Co., Ltd., Tokyo-to, Japan

[21] Appl. No.: 08/914,492

[22] Filed: Aug. 19, 1997

[30] Foreign Application Priority Data

Aug. 22, 1996 [JP] Japan ................................ 8-238692
Aug. 22, 1996 [JP] Japan ................................ P08-238693

[51] Int. Cl.$^7$ .................................................. H01M 4/02
[52] U.S. Cl. ........................................................ 429/211
[58] Field of Search ................................. 429/211, 233, 429/209; 29/623.1, 623.5, 2, 730; 204/280, 290 R

[56] References Cited

U.S. PATENT DOCUMENTS 5,419,982  5/1995  Tura et al. ............................. 429/162
5,480,462  1/1996  Tuttle ..................................... 29/623.5
5,657,522  8/1997  Figueira et al. ........................... 29/2

*Primary Examiner*—Maria Nuzzolillo
*Assistant Examiner*—Susy Tsang
*Attorney, Agent, or Firm*—Ladas & Parry

[57] ABSTRACT

An electrode plate for a secondary battery with a nonaqueous electrolyte composed of a collector and an active material layer which is formed of at least an active material and a binder disposed on the collector, and said electrode plate is provided with a terminal mounting portion provided with a collector surface exposed to mount a terminal. In such electrode plate, the exposed collector surface of the terminal mounting portion has the same shape and size substantially as those of an area to which the terminal is actually mounted. The electrode plate may further be provided with an identification mark made by forming the active material layer in shape of pattern on an area at which the collector surface is exposed or by exposing the collector surface in the shape of pattern on an area at which the collector is covered with the active material layer.

7 Claims, 8 Drawing Sheets

ELECTRODE PLATE FOR SECONDARY BATTERY WITH NONAQUEOUS ELECTROLYTE

BACKGROUND OF THE INVENTION

1. Field of the Invention

The present invention relates to an electrode plate for a secondary battery with a nonaqueous electrolyte, for example, represented by a lithium ion secondary battery and also relates to a process for producing such electrode plate.

2. Description of the Related Art

In recent years, reductions in size and weight of electronic equipments and communication equipments have been rapidly advanced, and therefore, it has also been required to reduce size and weight of a battery used as a driving power source for these equipments. For this request, there has been proposed a secondary battery with a nonaqueous electrolyte represented as a typical example by a lithium ion secondary battery having high energy density and high voltage.

There has also been required to propose an electrode plate, which significantly affects on the performance of the secondary battery, having large area of a thin film to elongate a charge/discharge cycle life and obtain a high energy density.

For examples, Japanese Patent Laid-open Publication Nos. 10456/1988 and 285262/1991 disclose positive electrode plates which are produced by the steps of dispersing or dissolving an active material powder for a positive electrode plate, which is composed of metallic oxides, sulfides, halides and the like, a conductive agent and a binder into a suitable wetting agent (referred to as "solvent" hereinafter) to prepare an active material coating solution in the form of paste, applying this active material coating solution on a surface of a collector as a substrate made of a metallic foil to form a coating layer (active material coating layer). In this process, as the binder, for example, there is used fluororesin such as polyvinylidene fluoride or silicone-acrylic copolymer.

The binder for preparing the active material coating solution for the above-mentioned coating type electrode plate is required to be chemically stable against the non-aqueous electrolyte, insoluble in the electrolyte, and soluble in a certain solvent to be able to be applied to the surface of the substrate made of a metallic foil. Furthermore, it is also required for the active material coating layer (coating layer) obtained by applying the coating solution and drying the same to have a flexibility so that any peeling, chipping and cracks do not occur to the coat film during the assembling process of the battery and also required to be excellent in adhesive property to the collector made of the mettalic foil.

In usual, for the electrode plate, the existence of the coating layer is unfavorable for a certain portion thereof, for example, a portion to which a terminal for introducing an electric current is connected or a portion at which the electrode plate is bent for preparing a battery. For this reason, the electrode plate is usually formed with at least a portion to which the coating solution is not applied, and a pattern of such not-coated (or non-coating) portion is optionally determined in accordance with a battery design. A method of forming such not-coated portion, in the conventional art, includes one method in which patterns of coating portions and non-coating portions are directly formed under a mechanical control of a coater head at a time of coating the electrode coating solution on the collector and another method in which the coated film after the drying is peeled off by a mechanical means to thereby form the not-coated portion.

In the one method mentioned above, however, it is difficult to form patterns at high speed because of mechanical problem in precision and irregularity of the coating layer thickness. Furthermore, in the another method mentioned above, since the peeling process requires much time, good patterning precision is not provided, or a production of powder at an edge of the peeled portion of the coating layer may be caused. Such methods are therefore not practical for the present industrial execution.

In the prior art mentioned above, some problems have been caused. For example, in the prior art, a collector surface is exposed by applying the active material coating solution only on a portion to be coated of the collector through the mechanical control of the coater to directly form the pattern of the non-coated portion, or by applying the active material coating solution on the entire surface of the collector and then dried to partially peel off the active material layer. As shown in FIG. 16, a terminal 105 is thereafter welded to the exposed collector surface. In this method, however, it is impossible to effectively form a fine pattern to the active material layer 103, and as shown in FIG. 15, the exposed area of the collector at a terminal mounting portion 104 is increased. Because of this reason, there was adapted a method in which a battery capacity is reduced to an amount corresponding to the increased exposed area, and the peeling-off of the active material layer results in loss of expensive material, providing a problem. Furthermore, when a collector having a large exposed area for mounting the terminal is rolled up after the production thereof for the storage or transportation, there may cause problems, for example, of irregularly wound-up condition because of difference in thicknesses of the coated portion and the non-coated portion and of winding strength of the electrode plate such that when the electrode plate is wound up with strong tension, wrinkle may be caused at the active material non-coated portion as the terminal mounting portion or an edge portion of the coating layer may be broken and powder may be produced at the edge portion, and on the other hand, when the electrode plate is loosely wound up, the rolled electrode plate may become loose and be deformed during the transportation to protrude a center portion thereof, thus providing a problem in handling thereof.

Theoretically, such problems may be solved by peeling off the active material layer only at an area to be brought into actually contact with the terminal so that substantially all the portion of the exposed collector surface at the terminal mounting portion is covered by the terminal mounted. In the prior art, however, it is considerably difficult to effectively and economically peel off the active material layer in a desired pattern from the collector surface.

Further, an electrode plate for a secondary battery is produced in mass production through a coating process to prepare an electrode plate having a wide width, and thereafter, through pressing, slit-forming, cutting, group winding, etc. processes. A secondary battery is produced by using such electrode plate through various assembling processes. In order to effectively perform these processes with high accuracy, it is available to apply process control marks, cutting marks, position alignment marks and the like mark to the electrode plate and also apply various identification marks or symbols such as manufacture lot numbers, barcodes and the like for easy identification and manufacture control of the electrode plate. However, the marking of such identification marks with a printing ink or the like increases the manufacturing step, and in addition to this defect, there involves a problem such that the printing ink marking the identification mark is dissolved in an electrolyte in a battery after the assembling thereof, which adversely affects on the performance of the battery. Because of this problem, it is difficult to properly select the printing ink to be used, and accordingly, the application of the identification marks was practically impossible, the process control or management for the battery manufacturing was made complicated and not effective, defective occurred frequently, and manufacturing cost was increased.

SUMMARY OF THE INVENTION

A primary object of the present invention is to substantially eliminate defects and problems encountered in the prior art described above and to provide an electrode plate for a secondary battery with a nonaqueous electrolyte having a terminal mounting portion of an area substantially the same as or slightly larger than an end portion of the terminal to be mounted for reducing active material loss, providing an excellent wind-up condition when wound in roll form and being capable of constituting a battery having high capacity.

A secondary object of the present invention is to provide an electrode plate for a secondary battery with a nonaqueous electrolyte applied with identification marks or the like such as manufacturer lot number without adversely affecting on the terminal mounting portion and the battery performance.

A further object of the present invention is to provide a process for producing such electrode plate having characters mentioned above.

The primary object of the present invention can be achieved by providing an electrode plate for a secondary battery with a nonaqueous electrolyte comprising a collector and an active material layer which is formed of at least an active material and a binder disposed on the collector, wherein said electrode plate is provided with a terminal mounting portion provided with a collector surface exposed to mount a terminal, said exposed collector surface having substantially the same shape and size as those of an area to which the terminal is actually mounted.

According to the present invention of the characters described above, the active material coating layer of the electrode plate is peeled off so as to provide a pattern shape to thereby form a terminal mounting portion having an area substantially the same as that of an end portion of a terminal to be mounted. Thus, after the mounting of the terminal, the exposed surface of the collector hardly remains to the terminal mounting portion, and accordingly, there is no loss of the active material layer and the electrode plate can be rolled up in a good wound-up form, providing a secondary battery with high performance.

The electrode plate provided with the terminal mounting portion formed into fine patterns can be effectively manufactured according to the present invention by providing, for example, a process for producing an electrode plate for a secondary battery with a nonaqueous electrolyte, and the process comprises the steps of:

applying an electrode forming composition comprising an active material and a binder on a collector, and drying the same to form an active material layer;

impregnating a liquid material, which has a cohesion larger than that of the active material layer after solidification of the liquid material, into a portion of the active material layer having an area substantially corresponding to an area of a terminal portion to which a terminal is actually mounted;

solidifying the liquid material to form a solidified material; and peeling off the portion of the active material layer into which the solidified material is impregnated to partially expose a collector surface.

Furthermore, the secondary object of the present invention can be achieved by providing an electrode plate for a secondary battery with a nonaqueous electrolyte comprising a collector and an active material layer which is formed of at least an active material and a binder disposed on the collector, wherein said electrode plate is provided with (1) a terminal mounting portion provided with a collector surface exposed to mount a terminal and (2) an identification mark putted by forming the active material layer in shape of pattern on an area at which the collector surface is exposed or by exposing the collector surface in the shape of pattern on an area at which the collector is covered with the active material layer.

According to the electrode plate of the characters described above, the active material coated film is exposed in shape of pattern to thereby simultaneously form the terminal mounting portion and the identification mark at optional portions of the electrode plate. Therefore, it is not necessary to carry out an independent step for printing the identification mark. Furthermore, the identification mark is the active material coating layer itself or a trimmed portion formed by removing the coating layer into the pattern shape, so that the identification mark cannot adversely affect on the performance of the battery after the assembling thereof.

The identification mark can be displayed by forming the active material layer in shape of pattern on the exposed surface of the collector at the terminal mounting portion of the electrode plate. Such electrode plate can be effectively manufactured by providing, for example, process for producing an electrode plate for a secondary battery with a nonaqueous electrolyte, comprising the steps of:

applying an electrode forming composition comprising an active material and a binder on a collector, and drying the same to form an active material layer;

impregnating a liquid material, which has a cohesion larger than that of the active material layer after solidification of the liquid material, into the active material layer of a terminal mounting portion except a pattern portion corresponding to an identification mark provided in the terminal mounting portion;

solidifying the liquid material to form a solidified material; and peeling off the portion of the active material layer into which the solidified material is impregnated to partially expose a collector surface.

Furthermore, the identification mark can be formed, without forming it to the terminal mounting portion, by exposing the surface of the collector in shape of pattern to an area covering the active material layer. Such electrode plate can be effectively manufactured by providing, for example, a process for producing an electrode plate for a secondary battery with a nonaqueous electrolyte, the process comprising the steps of:

applying an electrode forming composition comprising an active material and a binder on a collector, and drying the same to form an active material layer;

impregnating a liquid material, which has a cohesion larger than that of the active material layer after solidification of the liquid material, into a portion of the active material layer having an area corresponding to a terminal mounting portion and a pattern of an identification mark to be made;

solidifying the liquid material to form a solidified material; and peeling off the portion of the active material layer into which the solidified material is impregnated to partially expose a collector surface.

In preferred examples of the above embodiments of the present invention, the liquid material is in a solid state in a room temperature and in a liquid state in a heated condition. The liquid material which becomes liquid state in the heated condition comprises at least one of thermoplastic resin, organic or inorganic wax and low melting point-metal.

The liquid material which becomes liquid state in the heated condition has a melting viscosity in a range of 10 to 50000 cP. The liquid material which becomes liquid state in the heated condition has a melting point in a range of 20 to 250° C. The liquid material which becomes liquid state in the heated condition comprises at least one of polyethylene, polypropylene, low molecular polyethylene, low molecular polypropylene, wax and one of derivatives thereof.

A mask having a negative pattern of a pattern to which the liquid material is to be impregnated is covered on the active material layer, and the liquid material is then impregnated into the active material layer by applying through the mask.

The liquid material is impregnated by placing, to an area of a pattern of the active material layer to which the liquid material is to be impregnated, a formation member composed of a material having a solid state at a room temperature and a liquid state in a heated condition and having a shape substantially the same as the pattern of the active material layer and then heating the formation member. The liquid material is solidified, after the impregnation thereof, integrally with the formation member which is placed on the active material layer and the portion of the active material layer into which the liquid material is impregnated is removed together with the formation member by blowing air or picking up the formation member.

The nature and further characteristic features of the present invention will be made more clear from the following descriptions with reference to the accompanying drawings and the exemplary embodiments.

DESCRIPTION OF THE PREFERRED EMBODIMENTS

Figure 1:
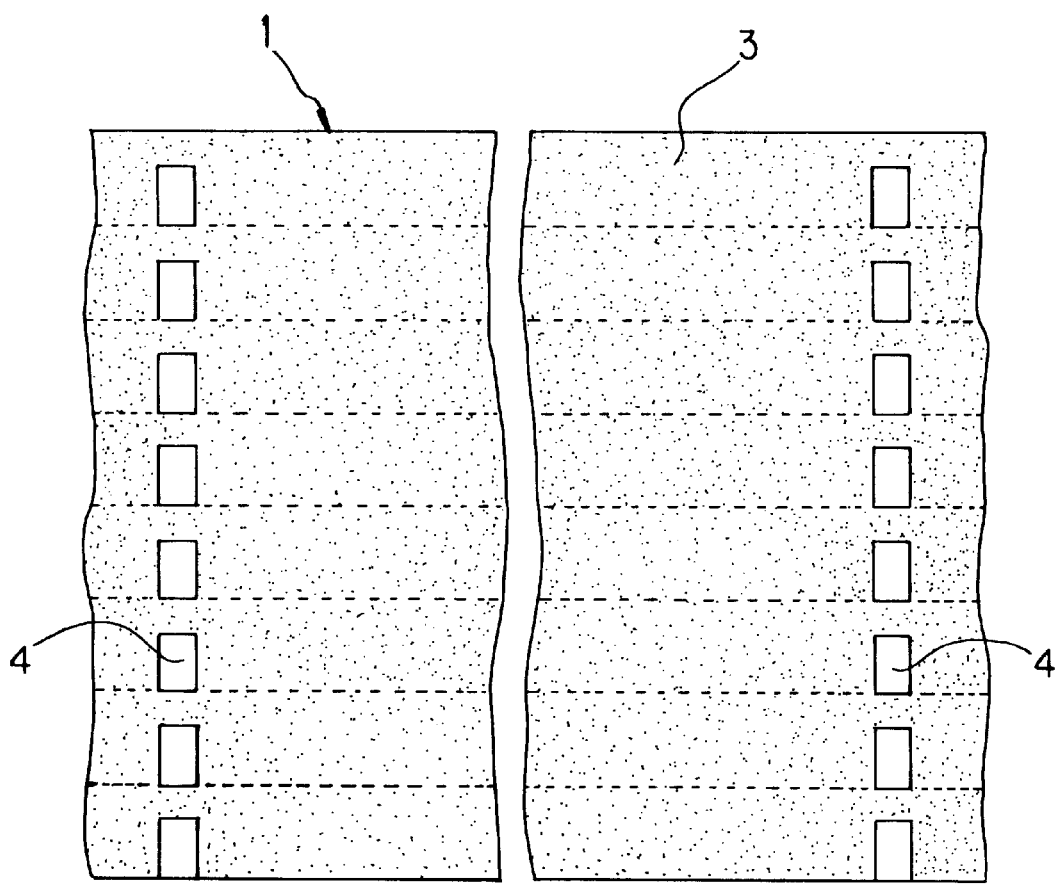
FIG. 1 is a plan view of an electrode plate according to a first embodiment of the present invention.

The present invention will be described in detail hereunder through preferred embodiments with reference to the accompanying drawings, in which like reference numerals are commonly added to the same or identical portions.

Figure 2:
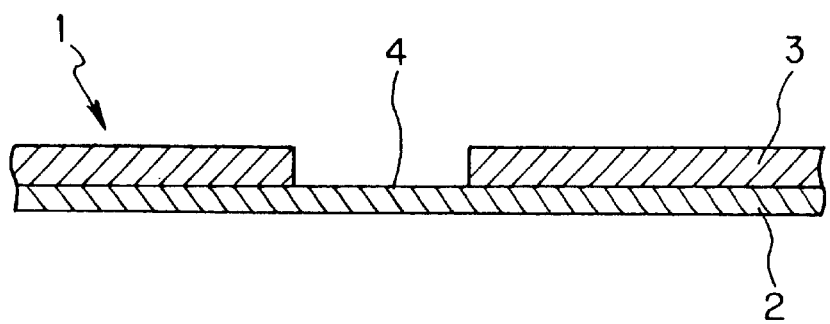
FIG. 2 is a sectional view of the electrode plate of FIG. 1 in an enlarged scale.
Figure 3:
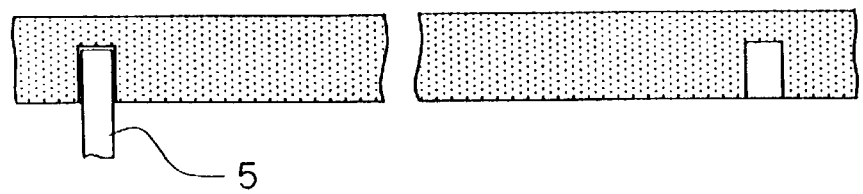
FIG. 3 is a plan view showing a state that the electrode plate of FIG. 1 is partially cut out and a terminal is mounted to a terminal mounting portion.

FIGS. 1 to 3 represent a first embodiment of the present invention, in which an electrode plate 1 has a collector provided with an extremely small exposed area for mounting a terminal.

FIG. 1 is a plan view of an electrode 1 provided with an active material layer 3 formed on a collector and a terminal mounting portion 4 having an area substantially corresponding to an end portion of a terminal to be mounted, and FIG. 2 is an enlarged view of one part of the electrode 1 of FIG. 1. Further, it is to be noted that an electrode for a secondary battery with a nonaqueous electrolyte of the present invention may take a shape shown in FIG. 1 or a shape shown in FIG. 2, which is the part obtained by cutting the electrode plate of FIG. 1 along a dotted line. It is also noted that the wording "substantially corresponding" means that the exposed surface portion of the collector for the terminal mounting portion has the same or substantially the same shape as that of the end portion of the terminal to be mounted to the exposed surface portion and has the same as or slightly larger or smaller than that of the terminal end portion so as to ensure an area to which the terminal can be mounted.

The electrode 1 of FIG. 1 is produced by the steps of applying an electrode forming composition composed of at least an active material and a binder on an entire surface of a collector 2 and then drying the same to thereby form an active material layer 3 and forming an exposed surface portion of a terminal mounting portion 4, to which a terminal 104 is mounted by partially peeling off the active material layer 3 from an area substantially corresponding to an area to which a terminal 5 is actually mounted. However, it is to be noted that the above process is one preferred process for the present invention, but the electrode plate for the secondary battery with the nonaqueous electrolyte of the present invention is not limited to this production process.

The inventors of the subject application have carried out extensive studies of a process for forming the terminal mounting portion in the form of pattern in the production of an electrode plate for a secondary battery with a nonaqueous electrolyte. In the process of the studies of the inventors, they directed their attentions to such facts that since the active material coating layer is composed of particles of an active material in a large amount and binder resin in a relatively small amount, the active material coating layer is porous and has a poor adhesive property to a collector, and that since the binder resin is used in a small amount, cohesion (i.e. strength) in the lateral direction of the active material layer is low.

More specifically, liquid tends to be easily permeate through the active material layer in the width direction (i.e. depth direction) due to the porosity thereof. When the active material layer is impregnated with liquid on the basis of an optional pattern and the liquid permeating in the active material layer is solidified, an impregnated portion becomes remarkably different from the non-impregnated portion thereof in physical strength. As a result, only the impregnated and then solidified portion of the active material layer can easily be peeled off from the collector, thereby exposing the collector surface with a desired pattern without leaving the active material layer at all to the peeled-off portion.

Further, it is to be noted that the process mentioned above will be applied to a case where a coating layer other than an active material layer of an electrode plate is to be peeled off in the form of pattern. That is, a solidifying agent is impregnated in the form of pattern to a coating layer having porous structure, like as in the active material layer, and having no strong adhesiveness to a substrate, and after the solidification thereof, the impregnated portion is peeled off to thereby form a sharp pattern.

Such process will be explained hereunder with reference to FIGS. 4 to 6.

Figure 4:
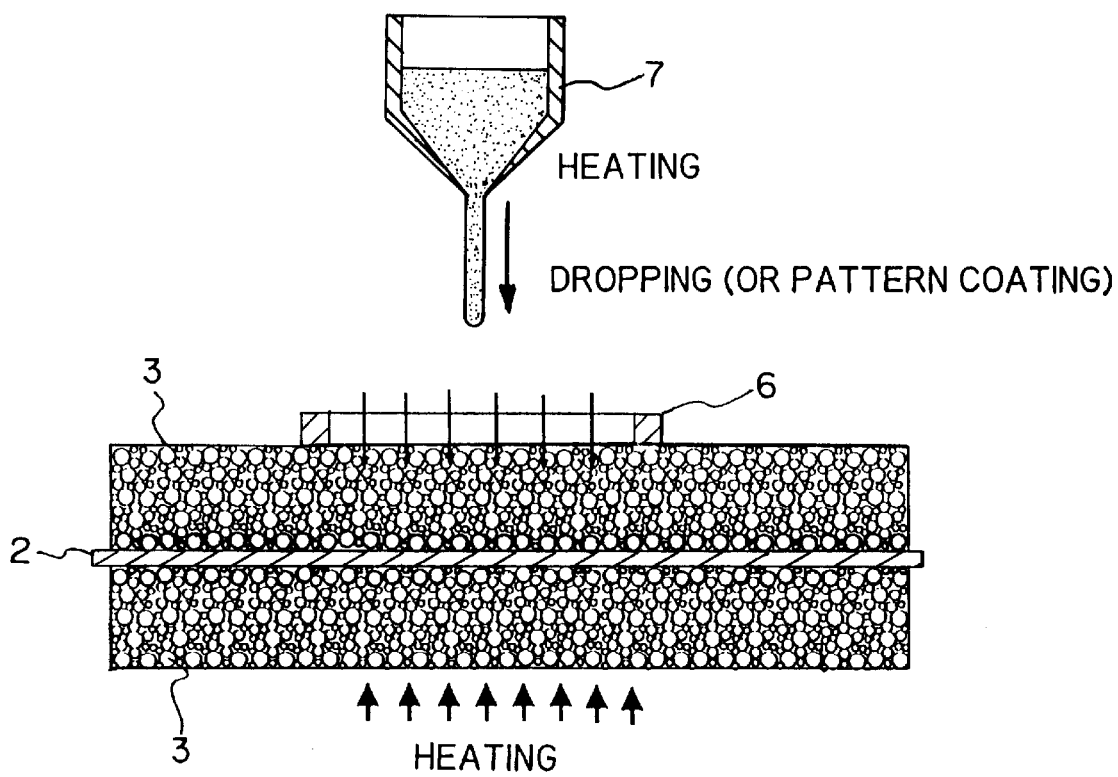
FIG. 4 is a schematic view showing one step in one example of production of the electrode plate of the first embodiment.

As shown in FIG. 4, a solidifying agent 7 such as wax is heat fused and dropped, through a suitable mask 6, on the active material layer 3 formed on the surface of the collector 2. The mask 6 has a negative pattern of a pattern which is desired to be impregnated and a masking plate corresponding to a position to be impregnated is cut away. The dropped wax permeates in the active material layer 3 and fills up cavities of the active material layer 3 in accordance with the pattern of the mask 6. In this state, the collector and/or active material layer may be heated in order to prevent the solidifying agent in liquid state from being solidified before reaching the collector surface.

Figure 5:
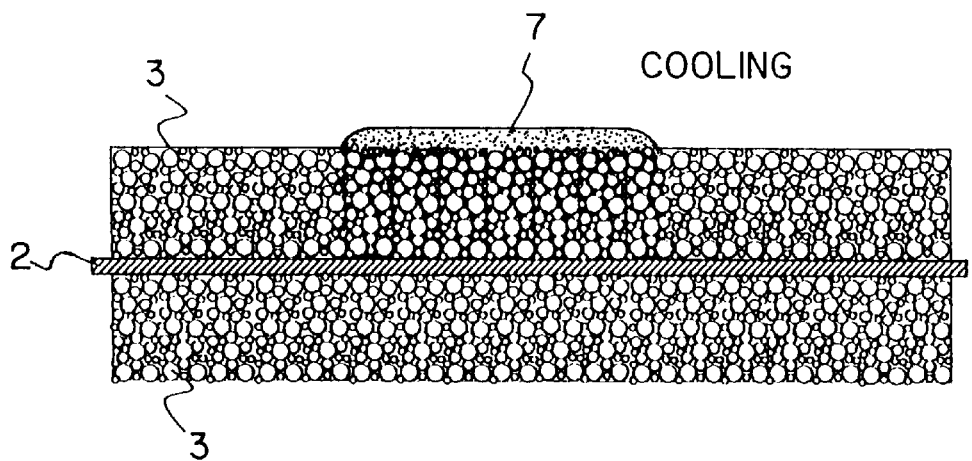
FIG. 5 is a schematic view showing another one step in one example for production of the electrode plate of the first embodiment.

FIG. 5 shows a state that the solidifying agent 7 permeates in the active material layer 3 and is solidified through cooling. In this state, a portion of the active material layer 3 through which the solidifying agent 7 permeates has an excessively higher density than that of the other portion and the former provides higher cohesion than that of the latter.

Figure 6:
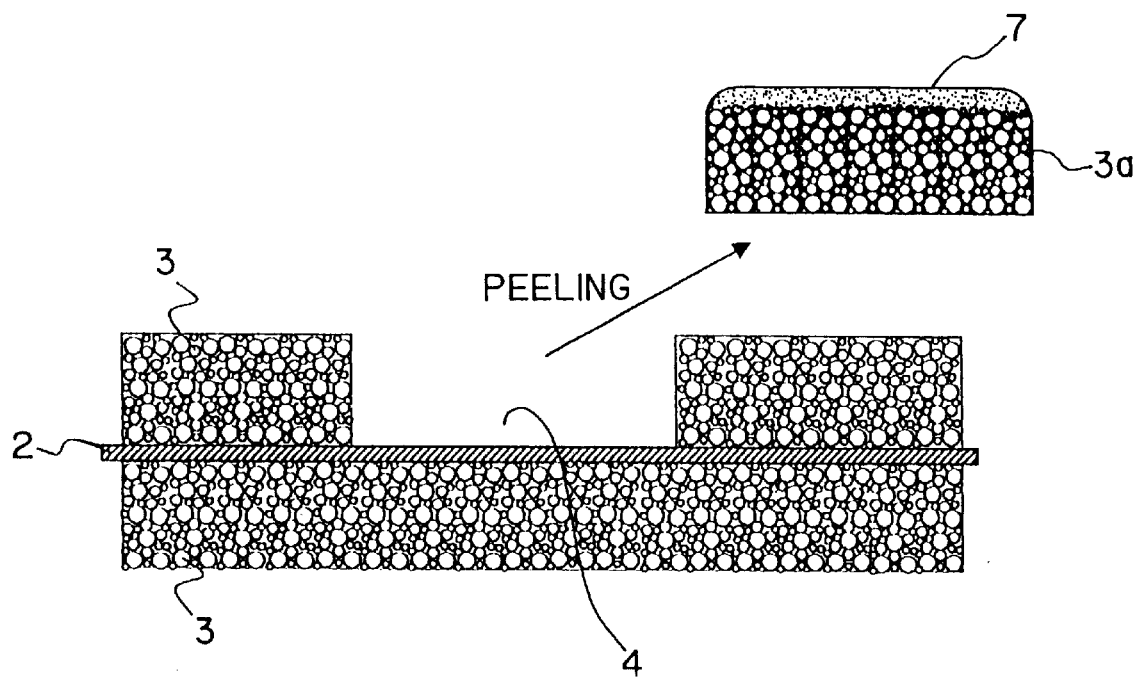
FIG. 6 is a schematic view showing a further one step in one example for production of the electrode plate of the first embodiment.

FIG. 6 shows a state that the portion 3a of the active material layer 3, which is impregnated with the solidifying agent, is peeled off, and this portion 3a has a higher density and a higher cohesion due to the impregnation with the solidifying agent. Thus, the cohesion of this portion 3a is excessively higher than that of the adjacent other portion, which is not impregnated with the solidifying agent, of the active material layer 3. Accordingly, when the portion 3a impregnated with the solidifying agent is peeled off by an appropriate means, the active material layer 3 can be sharply peeled off in a state that the active material layer 3 is surrounded by the solidifying agent 7 and, after the peeling-off thereof, the surface of the collector is exposed as a terminal mounting portion 4 in a sharp pattern. A shape of the pattern formed by the process of the present invention may be optionally selected.

In the process of the present invention, there is used, as a solidifying agent, a material which is in solid state at room temperature and can be liquefied by heat, for example, at least one of thermoplastic resin, organic or inorganic wax and a low melting point metal such as lead (Pb). In view of the object of the present invention, the solidifying agent preferably has a melting point of from 20 to 250° C., and more preferably, from 60 to 150° C. When the melting point of the solidifying agent is excessively low, it is softened even at a room temperature, leading to hard handling thereof and a poor productivity of the electrode plate. On the other hand, when the melting point of the solidifying agent is excessively high, there occurs uneconomical problem in energy.

The solidifying agent preferably has viscosity of from 10 to 50,000 mPa•s when melted, and more preferably, from 300 to 6,000 mPa•s. When the viscosity of the solidifying agent is exessively high, the solidifying agent tends not to easily permeate into fine cavities of the active material layer, resulting in a poor productivity of the electrode plate, and on the other hand, when the viscosity of the solidifying agent is excessively low, the solidifying agent in a molten state tends to spread over in the inside of the active material layer in a direction along a plane parallel to the surface thereof by the capillary phenomenon, thus making it impossible to form a sharp pattern. Further, it is preferable to limit an adhesive strength between the solidifying agent and the collector to a value as small as possible in view of workability in the peeling step.

As concrete examples of the solidifying agent 7, there may be listed the following materials: (1) thermoplastic resin such as polyolefin resin, such as polyethylene and polypropylene; polyvinyl chloride resin; polystyrene; polyvinyl acetate resin; ethylene-vinyl acetate copolymer; ethylene-vinyl chloride copolymer; and the like, (2) low molecular weight polyethylene, (3) low molecular weight polypropylene, (4) copolymer thereof, (5) synthetic wax such as micro-crystalline wax, polyethylene wax oxide and mixture thereof, (6) natural wax such as carnauba wax, and (7) derivative and mixture thereof As the solidifying agent of the material other than the above ones, there may be used materials, for example, polymerization liquid material and cross-linking liquid material, which can be transformed from the liquid phase to the solid phase through a chemical reaction. As such polymerization liquid material and cross-linking liquid material, there may be used polymerization liquid material and the cross-linking material used in printing ink or paint which have properties such as a thermosetting property, a catalytic-setting property, a setting property at a room temperature, an electron beam-setting property and an ultraviolet-setting property. Solidification of such kind of the solidifying agent may be carried out through heat treatment, catalytic reaction, addition of a cross-linking agent, electron beam radiation or ultraviolet-ray radiation.

When the active material layer is impregnated with the solidifying agent mentioned above, it is necessary for the solidifying agent to permeate in the fine cavities of the coating layer so as to reach the surface of the collector. If the liquefied solidifying agent is solidified before it reaches the surface of the collector, there is a fear that a portion to be removed of the coating layer may be left non-peeled even when the coating layer impregnated with the solidifying agent is peeled off from the collector. In order to prevent such problem from occurring, at least one of the collector and the coating layer or both may be heated to an appropriate temperature to delay the solidification of the solidifying agent, the solidifying agent having a low viscosity may be selected to increase the permeating speed thereof, or the solidifying agent may be kept at a sufficiently high temperature to delay the solidification thereof.

In a case where a copper foil is used as the collector for a negative electrode, the copper foil tends to be oxidized to produce a reddish surface thereof upon heating it to a temperature of at least 140° C. However, when the coating layer is heated by means of a hot plate during the application or dropping of the solidifying agent, since both the surfaces of the copper foil are coated with the coating layer and the heating is conducted from the side of the surface of the coating layer onto which the solidifying agent has been applied, the increase in the temperature of the hot plate to at least 140° C. does not cause the occurrence of the problem of the oxidization of the copper foil.

Further, in a case where one pattern is formed on one surface of the electrode plate after the another pattern is formed on the other surface thereof in order to respectively form the patterns at the same position on both the surfaces of the electrode plate, it is preferable to heat the coating layer by means of extreme infrared radiation or the like from one surface side on which the pattern is to be formed to keep the exposed back surface at a temperature of under 140° C. in order to prevent the exposed surface of the copper foil from being oxidized.

With respect to a method of impregnating the solidifying agent into the coating layer on the basis of the pattern, there will be adapted many methods such as a method of applying the solidifying agent in a molten state onto the active material layer, a method of arranging a solidifying agent formed in shape of pattern on the active material layer and heating the same to melt the solidifying agent which is in contact with the active material layer, a method of previously preparing a stencil having a prescribed pattern and applying the solidifying agent on the coating layer through the stencil to impregnate the solidifying agent.

In the case where the solidifying agent in the molten state is coated, it is possible to use a conventional coating apparatus such as a dispenser, a gravure roll, a die head and the like. For example, if a dropping apparatus for the solidifying agent as shown in FIG. 4 is attached to an X-axis and Y-axis plotter type driving apparatus, it is possible to drop the solidifying agent based on the prescribed pattern in accordance with the movement of the X-Y axis plotter so as to draw a character, a figure or a pattern. And the solidifying agent is dropped to draw these prescribed character, figure or pattern.

Since the active material layer including the solidifying agent is usually stuck to the collector with a weak force, the active material layer can be easily peeled off. When it is peeled off, the active material layer including the solidifying agent may be peeled off from the collector by applying tension of the collector to lift up the active material layer, by scraping the same by means of spatula or the like, by using an adhesive tape, or by blowing off the same by blowing air.

The impregnation of the solidifying agent into the active material layer may be performed before or after the pressing step to the active material layer as mentioned later.

Hereunder, respective materials constituting the electrode, for the production of the electrode plate for the secondary battery with the nonaqueous electrolyte according to the present invention, will be described. The secondary battery with a nonaqueous electrolyte is represented by a lithium secondary battery and is characterized by the use of the nonaqueous organic solvent as the electrolyte. For example, there is used an electrode plate in which the coating layer (active material layer) containing the active material for the electrode is formed on the collector made of a metallic foil and the nonaqueous organic solvent is used as an electrolyte. In such battery, charge and discharge can be performed through interchange of electrons during the movement of lithium ions between a positive electrode and a negative electrode of the battery.

The active material layer constituting the electrode plate for the secondary battery with the nonaqueous electrolyte according to the present invention is formed from a electrode forming composition containing at least the active material and the binder. As the active material for the positive electrode used in the present invention, there may be used at least one kind of lithium oxides such as $LiCoO_2$, $LiMn_2O_4$ and the like, and chalcogen compounds such as $TiS_2$, $MoO_2$, $MoO_3$, $V_2O_5$ and the like.

On the other hand, as the active material for the negative electrode used in the present invention, it will be preferable to use metallic lithium, lithium alloy and carbonacious material such as graphite, carbon black, acetylene black or the like. Particularly, when $LiCoO_2$ is used as the active material for the positive electrode and the carbonacious material is used as the active material for the negative electrode, a lithium secondary battery having a high discharge voltage of about 4 volt will be preferably provided. It is preferred to uniformly disperse these active materials in the coating layer to be formed. For this reason, it is preferable to use powder of the active material having a particle size of from 1 to 100 $\mu$m and an average particle size of about 10 $\mu$m.

Further, as the binder used in the present invention, there may be selectively used for example thermoplastic resin, i.e. polyester resin, polyamide resin, polyacrylate resin, polycarbonate resin, polyurethane resin, cellulose resin, polyolefin resin, polyvinyl resin, fluororesin and polyimide resin. In this case, compounds in which reactive functional group is introduced (i.e. acrylate monomer or oligomer) may be simultaneously mixed. The acrylate monomer and the oligomer may be used alone or in combination.

The active material layer constituting the electrode plate for the secondary battery with the nonaqueous electrolyte of the present invention is formed in the following manner. First, the electrode forming composition to be applied onto the collector surface is prepared with the use of the materials mentioned above. That is, the binder and the powdery active material properly selected from the above-mentioned materials are kneaded or dissolved in a state of dispersion with the use of an appropriate dispersing agent to thereby prepare the electrode forming composition.

Then, the thus prepared electrode forming composition is applied to the collector surface. As a coating method, there may be used a conventional method such as a gravure coating method, a gravure reverse method, a die coating method or a slide coating method. Thereafter, the electrode forming composition is dried to thereby form the active material layer having a predetermined thickness.

As the collector used for the electrode plate of the present invention for a secondary battery with a nonaqueous electrolyte, it is preferable to use a metallic foil such as an aluminum foil, a copper foil or the like. Such a metallic foil preferably has a thickness of from about 10 to 30 $\mu$m.

A method or process for preparing the electrode forming composition containing the active material used in the present invention will be described hereunder more concretely. First, the binder and the powdery active material which are approximately selected from the above-mentioned materials are added to a dispersing medium comprising an organic solvent such as toluene, and a conductive agent is added to the dispersing medium, as occasion demands, to prepare a mixture. The thus prepared mixture is subjected to a mixing and dispersing process with the use of the conventional dispersing apparatus such as a homogenizer, a ball mill, a sand mill, a roll mill or the like.

In such process, substantially the same mixing ratio of the binder and the active material as a conventional mixing ratio thereof will be applied, and for example, the mixing ratio of the binder to the active material is 2:8 to 1:9 will be preferred. Further, as a conductive agent added as occasion demands, there may be used, for example, carbonacious material such as graphite, carbon black, acetylene black or the like.

The thus prepared electrode forming composition is applied to the collector made of a metallic foil such as an aluminum foil, a copper foil and the like with the use of a gravure coater, a gravure reverse coater, a die coater or the like and then dried. Such electrode forming composition applying step and the drying step may be carried out several times to prepare the active material layer having a thickness of from about 10 to 200 $\mu$m, preferably, of from 50 to 170 $\mu$m.

In order to further improve homogeneity of the active material layer formed by the above-mentioned coating and drying steps, it will be preferred to apply a press treatment to the active material layer with the use of a metallic roll, a heating roll, a sheet pressing machine or the like to produce the electrode plate of the present invention. In the press treatment, it will be preferred to determine the pressing condition of from 500 Kgf/cm$^2$ to 7500 Kgf/cm$^2$, more preferably, from 3000 Kgf/cm$^2$ to 5000 Kgf/cm$^2$. In the case of less than 500 Kgf/cm$^2$, it is difficult to obtain an sufficiently improved homogeneity of the active material layer and, on the other hand, in the case of more than 7500 Kgf/cm$^2$, the electrode plate itself including the collector may be broken, thus being not preferred.

Furthermore, in a case where the secondary battery is produced with the use of the electrode plate of the present invention, which has been prepared in the above-mentioned manner, it is preferred to apply a heating treatment and a decompression treatment to the electrode plate prior to the assembling step of the secondary battery in order to remove moisture content in the active material layer. The process of the present invention for pattering the active material layer is applied to the electrode plate prepared in the above-mentioned manner.

Further, in a case where the lithium secondary battery is produced with the use of the thus prepared electrode plates, as positive and negative plates, of the present invention, there is used, as an electrolyte, a nonaqueous electrolyte prepared by dissolving lithium salts as solute into an organic solvent.

In the above steps, there may be used as an organic solvent, cyclic esters, chain esters, cyclic ethers, chain ethers or the like. The cyclic esters may be exemplified by propylene carbonate, butylene carbonate, γ-butyrolactone, vinylene carbonate, 2-methyl-γ-butyrolactone, acetyl-γ-butyrolactone and γ-valerolactone. The chain esters may be exemplified by dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, propionic acid alkyl ester, malonic acid dialkyl ester and acetic acid alkyl ester. The cyclic ethers may be exemplified by tetrahydrofuran, alkyl tetrahydrofuran, dialkyl tetrahydrofuran, alkoxy tetrahydrofuran, dialkoxy tetrahydrofuran, 1,3-dioxolan, alkyl-1,3-dioxolan and 1,4-dioxolan. The chain ethers may be exemplified by 1,2-dimethoxyethane, 1,2-diethoxyethane, diethyl ether, ethyl-eneglycol dialkylether, diethyleneglycol dialkylether, triethyleneglycol dialkylether, and tetraethyleneglycol dialkylether.

As lithium salts as solute forming the nonaqueous electrolyte in cooperation with the above-mentioned organic solvent, there may be used inorganic lithium salt such as $LiVlO_4$, $LiBF_4$, $LiPF_6$, $LiAsF_6$, $LiCl$, $LiBr$, or the like, or organic lithium salt such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$, $LiOSO_2C_7F_{15}$, or the like.

According to the first embodiment of the present invention, as described above, there can be provided an electrode plate for a secondary battery with a nonaqueous electrolyte with high capacity capable of reducing the loss of the active material and providing an improved roll-up performance by peeling off an active material layer of the electrode in the form of pattern to thereby form a terminal mounting portion having the exposed collector surface which is substantially accord with an end area of a terminal to be mounted thereto.

The first embodiment of the present invention will be described hereunder more in detail with reference to Experimental Examples and Comparative Examples.

SERIES OF EXAMPLES A

Example A-1

First, a electrode forming composition for a positive electrode containing an active material for the positive electrode was prepared in the following manner.

The following materials were used for preparing of the positive electrode forming composition: $LiCoO_2$ powder of 40 weight parts having a particle size of from 1 to 100 $\mu$m and an average particle size of 10 $\mu$m, a graphite powder of 5.0 weight parts as a conductive agent, a polyvinylidene fluoride of 4 weight parts as a binder (having the product name of "NEOFLON VDF, VP-850" manufactured by DAIKIN INDUSTRIES, CO. LTD.), and a N-methyl-2-pyrrolidone of 20 weight parts.

In these materials, the polyvinylidene fluoride was previously dissolved by N-methyl-2-pyrrolidone to preliminarily prepare a vanish, to which the other powdery materials were added. These powdery materials and the varnish were stirred and mixed by means of a planetary mixer (manufactured by KODAIRA SEISHAKUSHO CO. LTD.) for a period of time of 30 minutes to prepare the positive electrode forming composition in the form of slurry.

With the use of the thus prepared positive electrode forming composition, the coating step was carried out on a collector made of an aluminum foil having a thickness of 20 $\mu$m and a width of 300 mm by means of a die coater. Then, a drying step was performed at a temperature of 140° C. for 2 minutes to form an active material layer on the aluminum foil, which includes the active material for the positive electrode and have a thickness of 100 $\mu$m in a dried state. The resultant active material layer was then subjected to an aging treatment in a vacuum oven at a temperature of 80° C. for 48 hours to remove moisture in the active material layer, thereby preparing an electrode plate for the positive electrode.

Then, a electrode forming composition for a negative electrode containing an active material for the negative electrode was prepared in the following manner.

The following materials were used for preparation of the negative electrode forming composition: graphite powder of 85 weight parts, polyvinylidene fluoride of 15 weight parts (having the product name of "NEOFLON VDF, VP-850" manufactured by DAIKIN INDUSTRIES, CO. LTD.) and N-methyl-2-pyrrolidone as a dispersing medium of 225 weight parts. The negative electrode forming composition in the form of slurry was prepared by means of the same dispersing machine and in the same dispersing method as in the preparation of the positive electrode forming composition.

With the use of the thus prepared negative electrode forming composition, the coating step was carried out on a collector made of a rolled copper foil having a thickness of 15 μm by means of a die coater. A drying step was then performed at a temperature of 140° C. for 2 minutes to form an active material layer on the copper foil, which includes the active material for the negative electrode and has a thickness of 100 μm in a dried state. The resultant active material layer was then subjected to the same aging treatment as for the positive electrode to remove moisture in the active material layer, thereby preparing an electrode plate for the negative electrode.

The thus prepared electrode plates for the positive and negative electrodes were placed on a hot plate heated to a temperature of 90° C., and polypropylene (having the product name of "VISCOL 550P" manufactured by SANYO CHEMICAL INDUSTRIES, LTD.), which has been heated to a temperature of 250° C. to melt it, was applied on these electrode plates in a plurality of rectangular shapes each having a width of 3 mm and length of 7 mm by means of a dispenser through a metallic plate mask corresponding to a negative pattern having a shape shown in FIG. 1. Thereafter, the hot plate was removed and the polypropylene was solidified. The solidified polypropylene was hard and easily broken, and naturally raised by applying a tension to the collector and easily peeled off from the collector. The pattern of the terminal mounting portion thus formed had a sharp edge and no production of powder of the active material layer was observed.

Example A-2

Electrode plates for the positive and negative electrodes were prepared under substantially the same applying and drying conditions as those in the Example A-1.

The thus prepared electrode plates for the positive and negative electrodes were placed on a hot plate heated to a temperature of 120° C., and polyethylene (having the product name of "SANWAX 161P" manufactured by SANYO CHEMICAL INDUSTRIES, LTD.), which has been heated to a temperature of 250° C. to melt it, was applied on these electrode plate in a plurality of rectangular shapes each having a width of 3 mm and a length of 7 mm by means of a dispenser through a metallic plate mask corresponding to a negative pattern having a shape shown in FIG. 1. Thereafter, the hot plate was removed and the polyethylene was solidified. The solidified polyethylene provided a strong stiffness, and when it was lifted up by picking up an end portion thereof, the solidified polyethylene was easily removed from the collector with its shape being maintained. The pattern of the terminal mounting portion thus formed had a sharp edge and no production of powder of the active material layer was observed.

Example A-3

Electrode plates for the positive and negative electrodes were prepared under substantially the same applying and drying conditions as those in the Example A-1.

The thus prepared electrode plates for the positive and negative electrodes were heated to a temperature of 70° C. by means of infrared ray lamp, and a wax (having the product name of "DIACARNA 30L manufactured by MITSUBISHI CHEMICAL CORPORATION), which has been heated to a temperature of 160° C. to melt it, was applied on these electrode plates in a plurality of rectangular shapes each having a width of 5 mm and length of 5 mm by means of a dispenser through a metallic plate mask corresponding to a negative pattern having a shape shown in FIG. 1. Thereafter, the infrared ray lamp was removed and the wax was solidified. The solidified wax was hard and easily broken, and the solidified wax portion was naturally raised by applying a tension to the collector and easily peeled off from the collector. The pattern of the terminal mounting portion thus formed had a sharp edge and no production of powder of the active material layer was observed.

Example A-4

Electrode plates for the positive and negative electrodes were prepared under substantially the same applying and drying conditions as those in the Example A-1.

Onto positions of terminal mounting areas in the thus prepared positive and negative electrode plates, there was placed a polyethylene (having the product name of "SANWAX 161P" manufactured by SANYO CHEMICAL INDUSTRIES, LTD.), which has been melted and molded in the form of chips each having a width of 4 mm, length of 7 mm and thickness of 5 mm, corresponding to a negative pattern having a shape shown in FIG. 1. A hot plate heated to a temperature of 250° C. was brought into contact with back surface of the electrode plates for about one second and then, the hot plate was removed therefrom. In this stage, part of polyethylene chip coming into contact with the active material layer was melted and permeated through the active material layer, and then solidified. When a compressed air was blown to the upper chip portion, the solidified polyethylene portion was easily peeled off with its shape being maintained. The pattern of the terminal mounting portion thus formed had a sharp edge and no production of powder of the active material layer was observed.

Example A-5

Electrode plates for the positive and negative electrodes were prepared under substantially the same applying and drying conditions as those in the Example A-1.

The thus prepared electrode plates for the positive and negative electrodes were pressed by means of roll press with a pressure of 3000 Kgf/cm$^2$ and then placed on a hot plate heated to a temperature of 90° C., and polypropylene (having the product name of "VISCOL 550P" manufactured by SANYO CHEMICAL INDUSTRIES, LTD.), which has been heated to a temperature of 250° C. to melt it, was applied on these electrode plates in a plurality of rectangular shapes each having a width of 3 mm and a length of 6 mm by means of a dispenser through a metallic plate mask corresponding to a negative pattern having a shape shown in FIG. 1. Thereafter, the hot plate was removed and the polypropylene was solidified. The solidified polypropylene was hard and easily broken, and naturally raised by applying a tension to the collector and easily peeled off from the collector. The pattern of the terminal mounting portion thus formed had a sharp edge and no production of powder of the active material layer was observed.

Comparative Example A-1

Electrode plates for the positive and negative electrodes were prepared under substantially the same applying and drying conditions as those in the Example A-1.

A plurality of adhesive tapes, each having a width of 3 mm and a length of 6 mm, were stuck onto the thus prepared positive and negative electrode plates, and thereafter, the tapes were peeled off to thereby form terminal mounting portions. However, large amount of active material layer remained on the peeled-off surfaces of the electrode plates and the pattern formed in thus manner did not provide a sharp edge and production of powder of the active material layer was observed. It is impossible to use such adhesive tape for the peeling step in the practical industrial process.

Comparative Example A-2

Electrode plates for the positive and negative electrodes were prepared under substantially the same applying and drying conditions as those in the Example A-1.

Active material layers formed on the thus prepared positive and negative electrode plates were scraped to thereby remove them and form a plurality of terminal mounting portions, each providing a rectangular shape having a width of 5 mm and a length of 5 mm. However, large amount of active material layer remained on the peeled-off surfaces of the electrode plates and it was difficult to form the pattern, and the collector was damaged.

Comparative Example A-3

Electrode plates for the positive and negative electrodes were prepared under substantially the same applying and drying conditions as those in the Example A-1.

The thus prepared positive and negative electrode plates were kept at a room temperature and polypropylene (having the product name of "VISCOL 550P" manufactured by SANYO CHEMICAL INDUSTRIES, LTD.), which has been heated to a temperature of 250° C. to melt it, was applied on these electrode plates in a plurality of rectangular shapes each having a width of 3 mm and a length of 6 mm by a dispenser and then completely solidified through air cooling. In this process, the applied polypropylene was solidified on the surface of the active material layer prior to the permeation thereof, and since the active material layer remained on the collector even if the solidified polypropylene was removed, the terminal mounting portion could not be formed.

Comparative Example A-4

Electrode plates for the positive and negative electrodes were prepared under substantially the same applying and drying conditions as those in the Example A-1.

The thus prepared positive and negative electrode plates were placed on a hot plate heated to a temperature of 70° C., and wax (having the product name of "SP-0145" manufactured by NIPPON SEIRO CORPORATION), which has been heated to a temperature of 160° C. to melt it, was applied on these electrode plates in a plurality of rectangular shapes each having a width of 4 mm and a length of 7 mm by means of a dispenser. Thereafter, the hot plate was removed to solidify the wax. Since the wax has a low melting viscosity, it spreads over inside the active material layer through the capillary phenomenon at an instance of the coating, making it impossible to form a sharp pattern edge.

Figure 7:
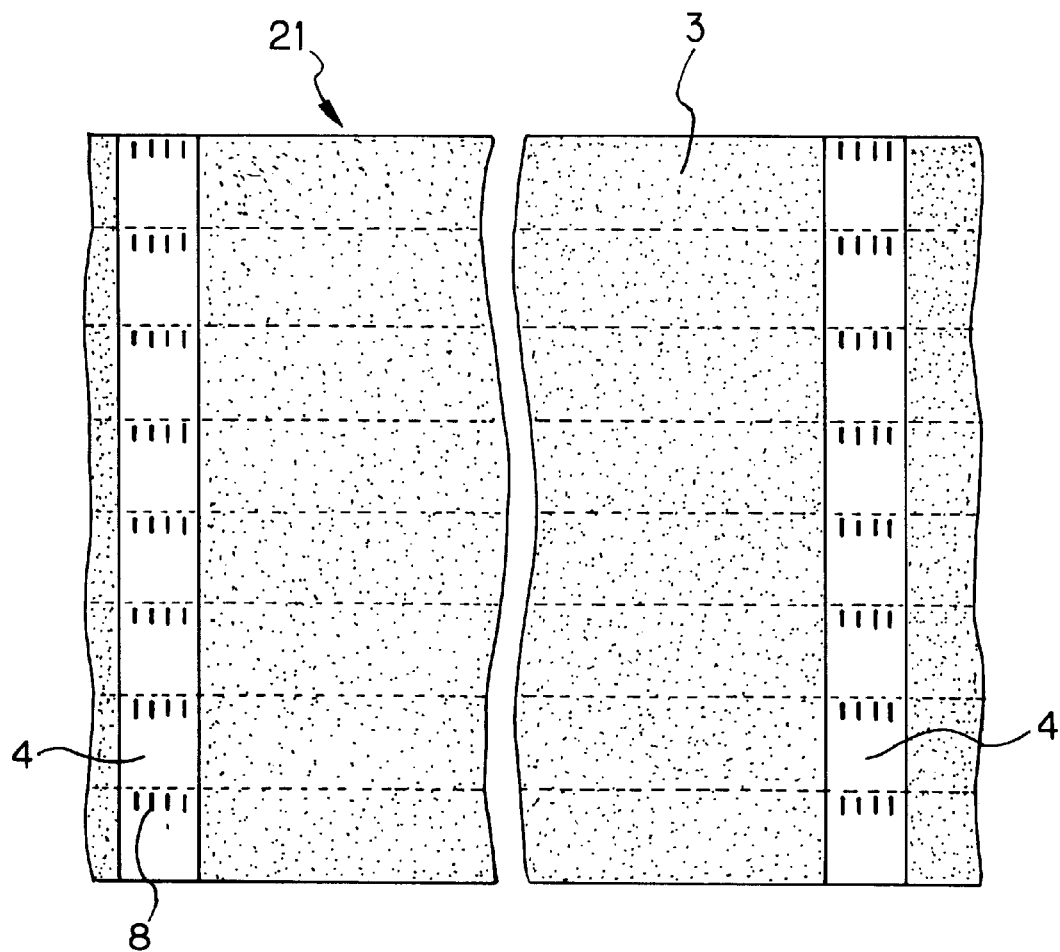
FIG. 7 is a plan view of an electrode plate according to a second embodiment of the present invention.
Figure 8:
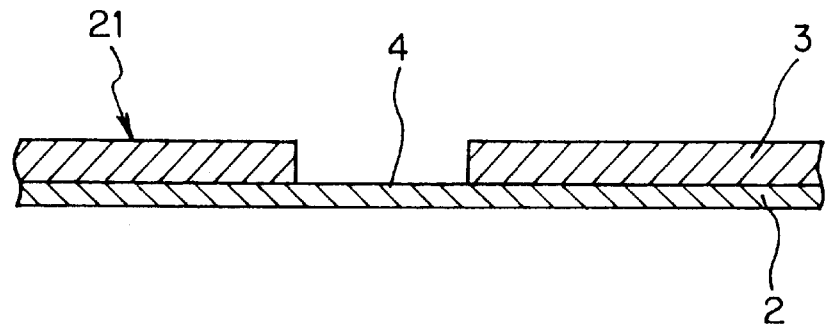
FIG. 8 is a sectional view of the electrode plate of FIG. 7 in an enlarged scale.
Figure 9:
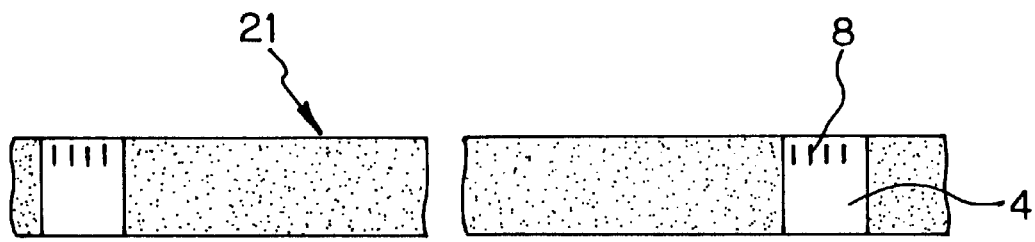
FIG. 9 is a plan view showing a state that the electrode plate of FIG. 7 is partially cut out and a terminal is mounted to the terminal mounting portion.

FIGS. 7 to 9 represent the second embodiment of the present invention, showing an electrode plate 21 as one preferred example of the embodiment to which an identification mark is made by an active material layer formed in shape of pattern at an area in which the collector surface is exposed.

FIG. 7 is a plan view of the electrode plate 21 in which the active material layer 3 is formed on almost all the surface of the collector 2 and the identification marks 8 are made by forming the active material layer 3 in shape of patterns on the exposed collector surface of the terminal mounting portions 4. FIG. 8 is an enlarged sectional view of a portion of the electrode plate 21 of FIG. 7. The electrode plate for a secondary battery with a nonaqueous electrolyte according to this embodiment may take a shape shown in FIG. 7 or a shape shown in FIG. 9, which is a part obtained by cutting away along the dotted line in FIG. 7.

Further, in the second embodiment, the identification marks may be provided by forming the exposed surface area of the collector independent from the terminal mounting portions 4 and by forming the active material layer 3 in shape of patterns on that exposed surface area.

The electrode 21 of the structure mentioned above will be prepared by first applying the electrode forming composition composed of at least an active material and a binder on the collector 2 and then drying it to form an active material layer 3 on the entire surface of the collector 2, and next, by removing the active material layer 3 from a portion to be the terminal mounting portions 4 except the portions to which the identification marks are formed. It is however to be noted that this method is mere one preferred process of the present invention and the electrode plate for the secondary battery with the nonaqueous electrolyte of the present invention is not limited to this manufacturing process.

Figure 10:
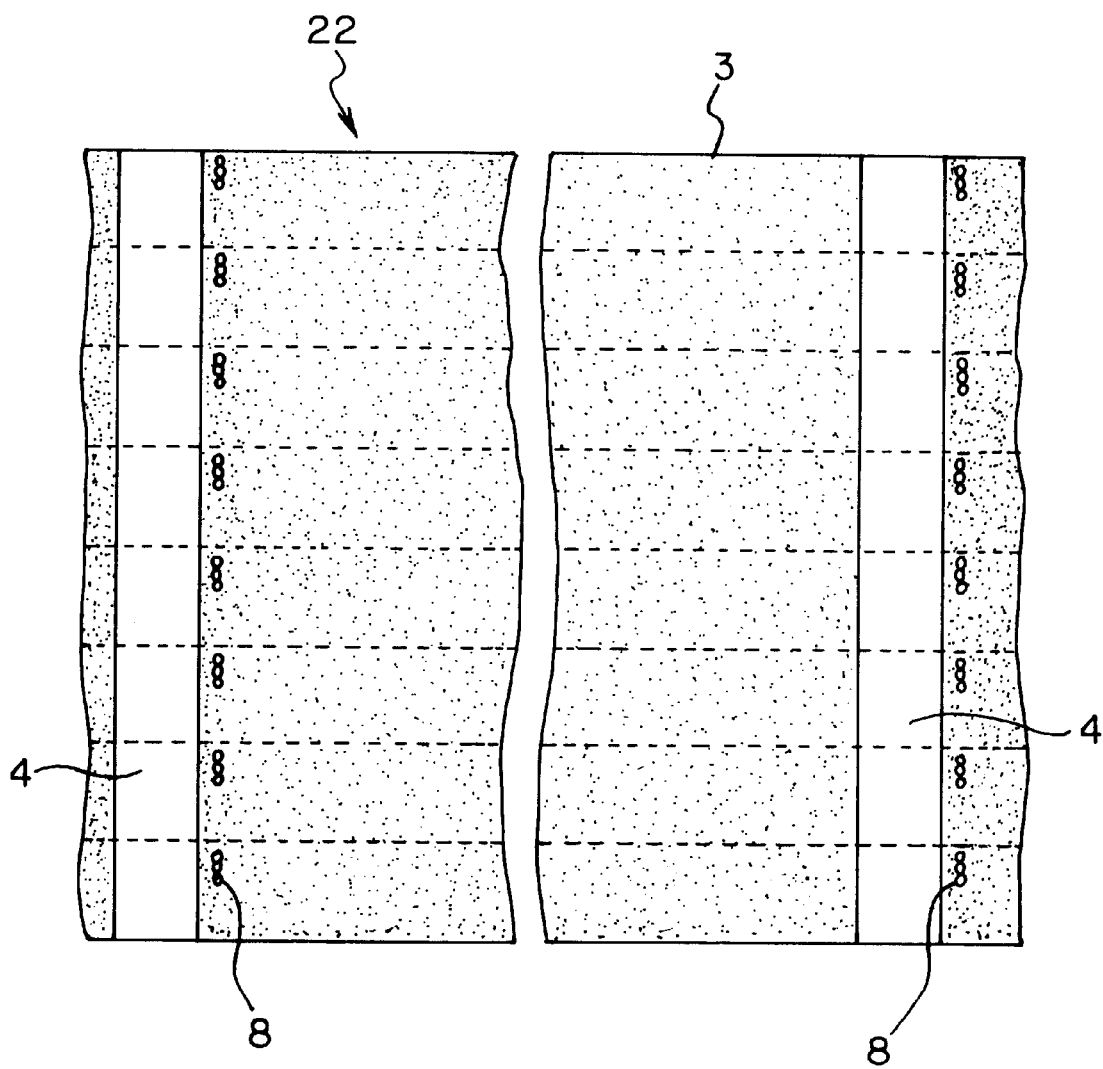
FIG. 10 is a plan view of an electrode plate according to a third embodiment of the present invention.
Figure 11:
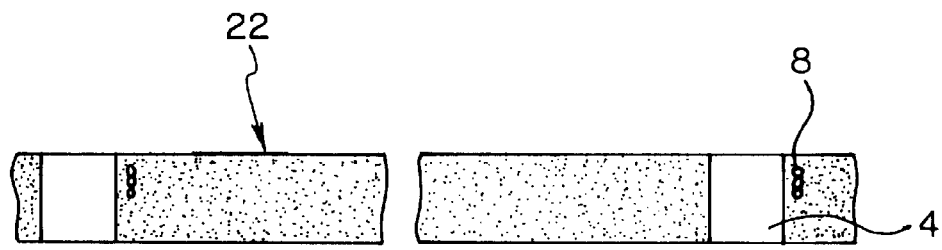
FIG. 11 is a plan view showing the electrode plate of FIG. 10 which is partially cut away.

FIGS. 10 and 11 represent the third embodiment of the present invention, showing an electrode 22 as one preferred example of the embodiment, in which the identification marks are provided by exposing the collector surface, in shape of patterns, of the area coated with the active material layer.

FIG. 10 is a plan view of the electrode plate 22 in which the surface of the collector 2 at the area, near the terminal mounting portions 4, covered with the active material layers 3 are exposed so as to provide patterns as the identification marks 8. The electrode plate for a secondary battery with a nonaqueous electrolyte according to this embodiment may take a shape shown in FIG. 10 or a shape shown in FIG. 11, which is a part obtained by cutting away along the dotted line in FIG. 10.

Further, in the third embodiment, it may be possible to substantially accord the shape and the size of the exposed collector surface at the terminal mounting portion with those of the end portion of the terminal to be mounted.

The electrode 22 of the structure mentioned above will be prepared by first applying the electrode forming composition composed of at least an active material and a binder on the collector 2 and then drying it to form an active material layer 3 on the entire surface of the collector 2, and next, by removing the active material layer 3 from a portion to be the terminal mounting portions 4, and peeling off the active material layer 3 near the terminal mounting portion 4 in shape of patterns to thereby form the identification marks 8. It is however to be noted that this method is mere one preferred process of the present invention and the electrode plate for the secondary battery with the nonaqueous electrolyte of the present invention is not limited to this manufacturing process.

The electrode plates of the second and third embodiments mentioned above will be manufactured in substantially the same manner as that mentioned with respect to the first embodiment, and particularly, the active material layer can be effectively patterned by using the solidifying agent so as to provide a sharp edge of the pattern.

Figure 12:
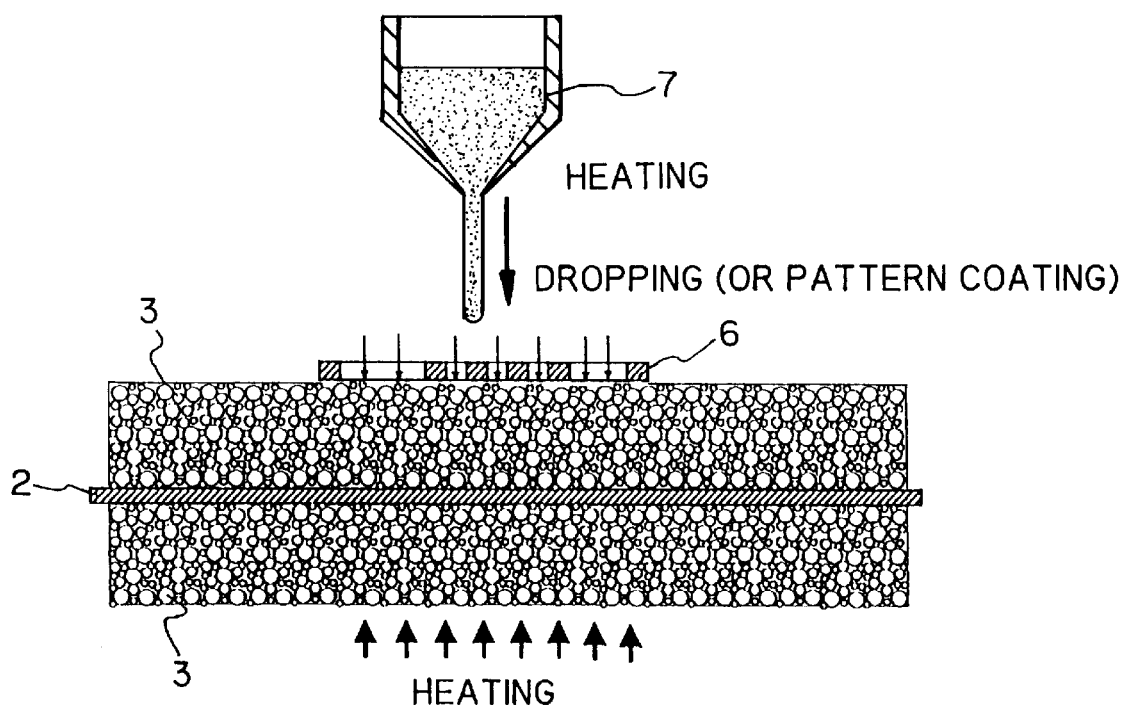
FIG. 12 is a schematic view showing one step in one example for production of the electrode plate of the second embodiment.
Figure 13:
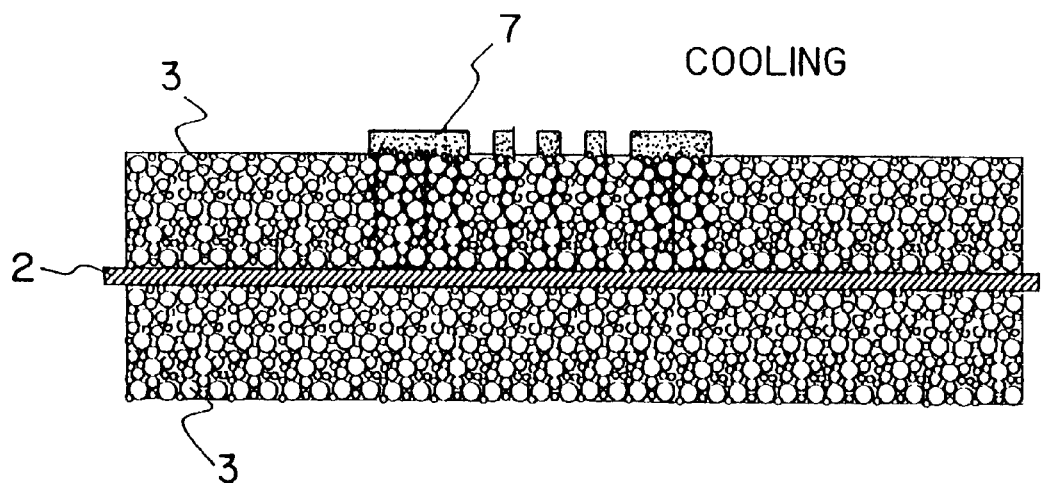
FIG. 13 is a schematic view showing another one step in one example for production of the electrode plate of the second embodiment.
Figure 14:
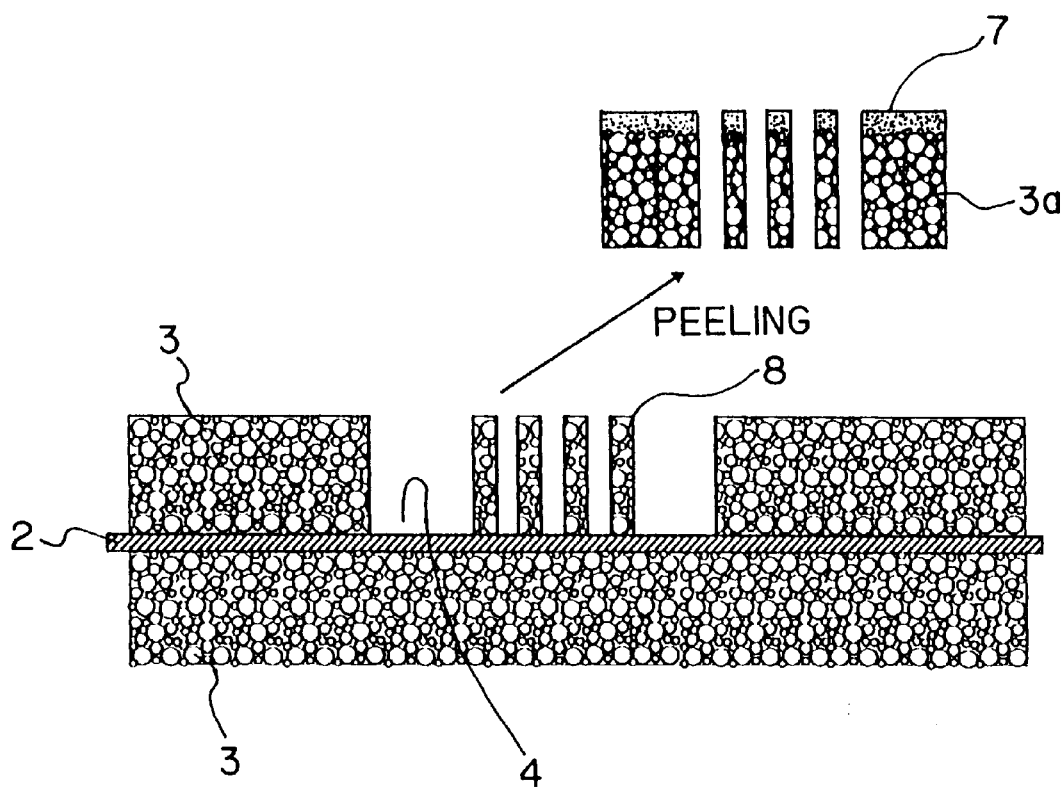
FIG. 14 is a schematic view showing a further one step in one example for production of the electrode plate of the second embodiment.
Figure 15:
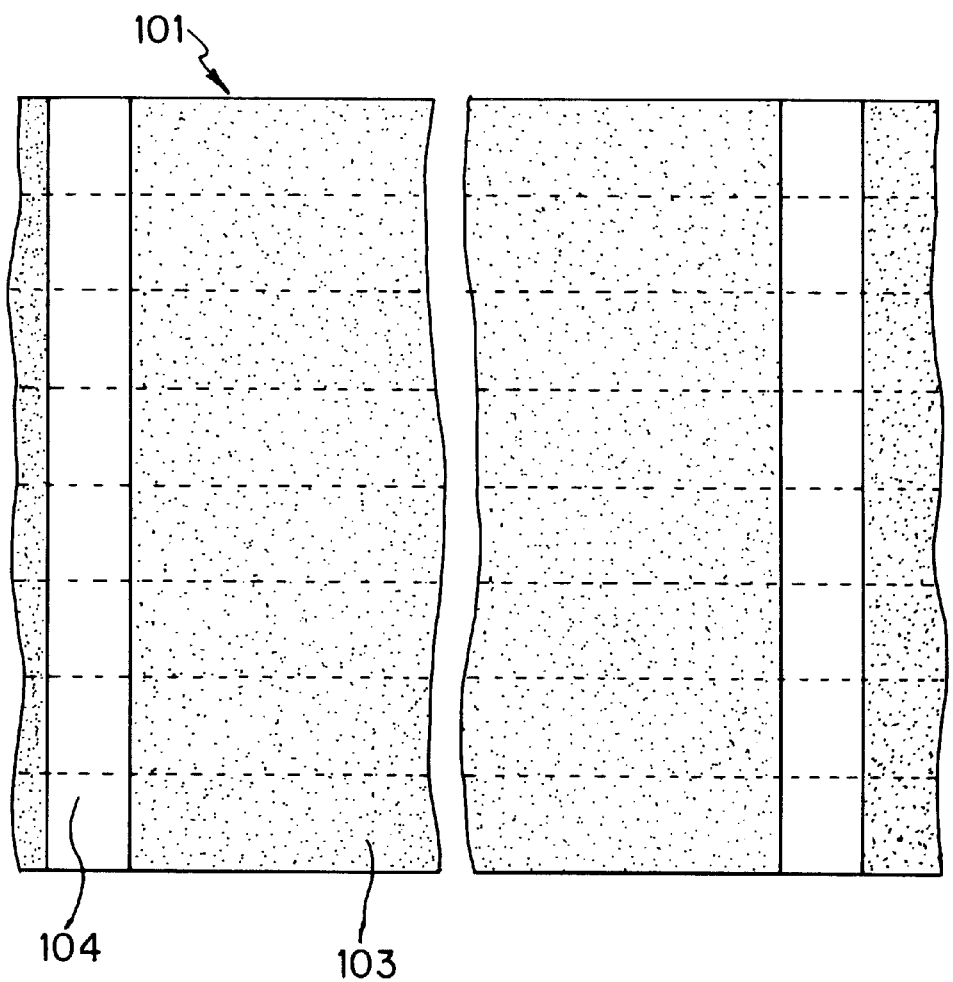
FIG. 15 is a plan view showing an electrode plate of a conventional structure.
Figure 16:
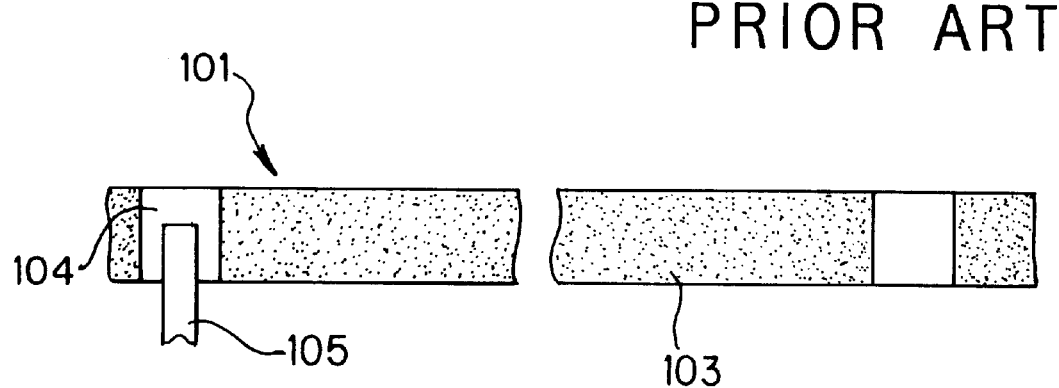
FIG. 16 is a plan view of the conventional electrode plate of FIG. 15 which is partially cut out and a terminal is mounted to the terminal mounting portion.

FIGS. 12 to 14 represent the series of steps for manufacturing the electrode plate of the second embodiment.

First, as shown in FIG. 12, the solidifying agent 7 such as wax, which has been heated to be melted, is dropped through a proper mask 6 on the active material layer 3 formed on the surface of the collector 2. The dropped wax then permeates into the active material layer 3 and fills up the cavities of the active material layer 3 in accordance with the pattern of the mask 6. At this time, in order to prevent the solidifying agent in liquid state from being solidified before reaching the surface of the collector 2, the collector and/or active material layer may be heated.

FIG. 13 shows a state in which the solidifying agent 7 permeates into the active material layer 3 and is solidified through a cooling process, and in this state, the area of the active material layer into which the solidifying agent 7 permeates has a density extremely larger than that of the other area thereof and this area has a cohesion also extremely larger than that of the other area.

FIG. 14 shows a state in which the solidifying agent permeating area 3a is peeled off. The solidifying agent permeating area 3a has a high density and high cohesion because of the filling of the solidifying agent 7, and the cohesion in this area 3a is extremely larger than that in a portion, in which the solidifying agent 7 does not permeate, of the active material layer 3 adjacent to this area 3a. Accordingly, when the solidifying agent permeating area 3a is peeled off by any appropriate means, the active material layer 3 can be peeled off sharply in a condition being enclosed by the solidifying agent 7, and hence, after the peeling, the identification mark 8 and the collector surface as the terminal mounting portion 4, both of which have sharp patterns, are exposed. The shapes of the patterns of the identification mark and the terminal mounting portion formed in accordance with the present invention can be optionally selected.

According to the second and third embodiments, the solidifying agent of the characters mentioned above with reference to the first embodiment can be used, and moreover, the solidifying agent can permeate into the active material layer as like in the first embodiment. Accordingly, the active material layer may permeate without using the mask.

Furthermore, according to the second and third embodiments, the active material layer can be formed as like in the first embodiment and a battery can be assembled.

As mentioned above, according to the second and third embodiments of the present invention, the terminal mounting portion and the identification mark can be formed at the same time to optional portions of the electrode plate by forming the active material of the electrode plate in shape of patterns or exposing the collector surface of the electrode plate in shape of patterns.

Further, since the identification mark formed in the above mentioned manner is the active material coating layer itself or a trimmed portion formed by removing the coating layer into the pattern shape, the identification mark cannot adversely affect on the performance of the battery after the assembling thereof.

The second and third embodiments of the present invention will be described hereunder more in detail with reference to Examples and Comparative Examples.

SERIES OF EXAMPLES B

Example B-1

First, a electrode forming composition for a positive electrode containing an active material for the positive electrode was prepared in the following manner.

The following materials were used for preparing of the positive electrode forming composition: $LiCoO_2$ powder of 40 weight parts having a particle size of from 1 to 100 $\mu$m and an average particle size of 10 $\mu$m, a graphite powder of 5.0 weight parts as a conductive agent, a polyvinylidene fluoride of 4 weight parts as a binder (having the product name of "KF#1100," manufactured by KUREHA CHEMICAL INDUSTRY, CO. LTD.), and an N-methyl-2-pyrrolidone of 20 weight parts.

In these materials, the polyvinylidene fluoride was previously dissolved in N-methyl pyrolidone to preliminarily prepare a vanish, to which the other powdery materials were added. These powdery materials and the varnish were stired and mixed by means of a planetary mixer (manufactured by KODAIRA SEISHAKUSHO CO. LTD.) for a period of time of 30 minutes to prepare the positive electrode forming composition in the form of slurry.

With the use of the thus prepared positive electrode forming composition, the coating step was carried out on a collector made of an aluminum foil having a thickness of 20 $\mu$m and a width of 300 mm by means of a die coater. Then, a drying step was performed at a temperature of 140° C. for 2 minutes to form a active material layer on the aluminum foil, which includes the active material for the positive electrode and have a thickness of 100 $\mu$m in a dried state. The resultant active material layer was then subjected to an aging treatment in a vacuum oven at a temperature of 80° C. for 48 hours to remove moisture in the active material layer, thereby preparing an electrode plate for the positive electrode.

Then, a electrode forming composition for a negative electrode containing an active material for the negative electrode was prepared in the following manner.

The following materials were used for preparation of the negative electrode forming composition: graphite powder of 85 weight parts, polyvinylidene fluoride of 15 weight parts (having the product name of "KF#1100" manufactured by KUREHA CHEMICAL INDUSTRY, CO. LTD.) and N-methyl-2-pyrrolidone as a dispersing medium of 225 weight parts. The negative electrode forming composition in the form of slurry was prepared by means of the same dispersing machine and in the same dispersing method as in the preparation of the positive electrode forming composition.

With the use of the thus prepared negative electrode forming composition, the coating step was carried out on a collector made of a rolled copper foil having a thickness of 15 $\mu$m by means of a die coater. A drying step was then performed at a temperature of 140° C. for 2 minutes to form an active material layer on the copper foil, which includes the active material for the negative electrode and has a thickness of 100 $\mu$m in a dried state. The resultant active material layer was then subjected to the same aging treatment as for the positive electrode to remove moisture in the active material layer, thereby preparing an electrode plate for the negative electrode.

The thus prepared electrode plates for the positive and negative electrodes were placed on a hot plate heated to a temperature of 90° C., and polypropylene (having the product name of "VISCOL 550P" manufactured by SANYO CHEMICAL INDUSTRIES, LTD.), which has been heated to a temperature of 250° C. to melt it, was applied on these electrode plates in a belt shape having a width of 10 mm and a length of 200 mm by means of a dispenser through a metallic plate mask corresponding to a negative pattern having a shape shown in FIG. 7. Thereafter, the hot plate was removed and the polypropylene was solidified. The solidified polypropylene was hard and easily broken, and naturally raised by applying a tension to the collector and easily peeled off from the collector. The patterns of the terminal mounting portion and the identification mark thus formed had sharp edges and no production of powder of the active material layer was observed.

Example B-2

Electrode plates for the positive and negative electrodes were prepared under substantially the same applying and drying conditions as those in the Example B-1.

The thus prepared electrode plates for the positive and negative electrodes were placed on a hot plate heated to a temperature of 120° C., and polyethylene (having the product name of "SANWAX 161P" manufactured by SANYO CHEMICAL INDUSTRIES, LTD.), which has been heated to a temperature of 250° C. to melt it, was applied on these electrode plate in a belt shape having a width of 10 mm and a length of 200 mm by means of a dispenser through a metallic plate mask corresponding to a negative pattern having a shape shown in FIG. 10. Thereafter, the hot plate was removed and the polyethylene was solidified. The solidified polyethylene provided a strong stiffness, and when it was lifted up by picking up an end portion thereof, the solidified polyethylene was easily removed from the collector with its shape being maintained. The patterns of the terminal mounting portion and the identification mark thus formed had sharp edges and no production of powder of the active material layer was observed.

Example B-3

Electrode plates for the positive and negative electrodes were prepared under substantially the same applying and drying conditions as those in the Example B-1.

The thus prepared electrode plates for the positive and negative electrodes were heated to a temperature of 70° C. by means of infrared ray lamp, and a wax (having the product name of "DIACARNA 30L manufactured by MITSUBISHI CHEMICAL CORPORATION), which has been heated to a temperature of 160° C. to melt it, was applied on these electrode plates in a belt shape having a width of 10 mm and a length of 200 mm through a metallic plate mask corresponding to a negative pattern having a shape shown in FIG. 7. Thereafter, the infrared ray lamp was removed and the wax was solidified. The solidified wax was hard and easily broken, and the solidified wax portion was naturally raised by applying a tension to the collector and easily peeled off from the collector. The patterns of the terminal mounting portion and the identification mark thus formed had sharp edges and no production of powder of the active material layer was observed.

Example B-4

Electrode plates for the positive and negative electrodes were prepared under substantially the same applying and drying conditions as those in the Example B-1.

Onto the surface of the active material layers of the thus prepared positive and negative electrode plates, there was placed a polyethylene (having the product name of "SANWAX 161P" manufactured by SANYO CHEMICAL INDUSTRIES, LTD.), which has been melted and molded in the form of ribbon having a width of 30 mm, length of 200 mm and thickness of 5 mm, corresponding to a negative pattern having a shape shown in FIG. 7. A hot plate heated to a temperature of 250° C. was brought into contact with back surface of the electrode plates for about one second and then, the hot plate was removed therefrom. In this stage, part of polyethylene ribbon coming into contact with the active material layer was melted and permeated through the active material layer, and then solidified. When the ribbon was lifted up by picking up an end portion thereof, the solidified portion of the polyethylene was easily peeled off with its shape being maintained. The patterns of the terminal mounting portion and the identification mark thus formed had sharp edges and no production of powder of the active material layer observed.

Example B-5

Electrode plates for the positive and negative electrodes were prepared under substantially the same applying and drying conditions as those in the Example B-1.

The thus prepared electrode plates for the positive and negative electrodes were pressed by means of roll press with a pressure of 3000 Kgf/cm$^2$ and then placed on a hot plate heated to a temperature of 90° C., and polypropylene (having the product name of "VISCOL 550P" manufactured by SANYO CHEMICAL INDUSTRIES, LTD.), which has been heated to a temperature of 250° C. to melt it, was applied on these electrode plates in a belt shape having a width of 10 mm and a length of 200 mm by means of a dispenser through a metallic plate mask corresponding to a negative pattern having a shape shown in FIG. 10. Thereafter, the hot plate was removed and the polypropylene was solidified. The solidified polypropylene was hard and easily broken, and naturally raised by applying a tension to the collector and easily peeled off from the collector. The patterns of the terminal mounting portion and the identification mark thus formed had sharp edges and no production of powder of the active material layer was observed.

Comparative Example B-1

Electrode plates for the positive and negative electrodes were prepared under substantially the same applying and drying conditions as those in the Example B-1.

A belt-shaped adhesive tape having a width of 10 mm and a length of 200 mm was stuck onto the thus prepared positive and negative electrode plates, and thereafter, the tape was peeled off to thereby form terminal mounting portion. However, a large amount of active material layer remained on the peeled-off surfaces of the electrode plates and the pattern formed in thus manner did not provide a sharp edge and production of powder of the active material layer was observed, and accordingly, it is not practicable in an industrial usage to peel off the active material layer by using the tape.

Comparative Example B-2

Electrode plates for the positive and negative electrodes were prepared under substantially the same applying and drying conditions as those in the Example B-1.

Active material layers formed on the thus prepared positive and negative electrode plates were scraped to thereby remove them and form a terminal mounting portion having a width of 10 mm and a length of 200 mm. However, large amount of active material layer remained on the peeled-off surfaces of the electrode plates and it was difficult to form the pattern, and the collector was damaged.

Comparative Example B-3

Electrode plates for the positive and negative electrodes were prepared under substantially the same applying and drying conditions as those in the Example B-1.

The thus prepared positive and negative electrode plates were kept at a room temperature and polypropylene (having the product name of "VISCOL 550P" manufactured by SANYO CHEMICAL INDUSTRIES, LTD.), which has been heated to a temperature of 250° C. to melt it, was applied on these electrode plates in a belt shape having a width of 10 mm and a length of 200 mm by a dispenser, and then completely solidified through air cooling. In this process, the applied polypropylene was solidified on the surface of the active material layer prior to the permeation thereof, and since the active material layer remained on the collector even if the polypropylene was removed, the terminal mounting portion could not be formed.

Comparative Example B-4

Electrode plates for the positive and negative electrodes were prepared under substantially the same applying and drying conditions as those in the Example B-1.

The thus prepared positive and negative electrode plates were placed on a hot plate heated to a temperature of 70° C., and wax (having the product name of "SP-0145" manufactured by NIPPON SEIRO CORPORATION), which has been heated to a temperature of 160° C. to melt it, was applied on these electrode plates in a belt shape having a width of 10 mm and a length of 200 mm by means of a dispenser. Thereafter, the hot plate was removed to solidify the wax. Since the wax has a low melting viscosity, it spreads over inside the active material layer through the capillary phenomenon at an instance of the coating, making it impossible to form a sharp pattern edge.

What is claimed is:

1. An electrode plate for a secondary battery with a nonaqueous electrolyte comprising:

a collector;

an active material layer disposed on the collector, wherein the active material layer includes an active material and a binder;

a terminal mounting portion having a collector surface exposed for mounting a terminal, and the exposed collector surface having substantially the same shape and size as an area to which the terminal is actually mounted; and wherein the electrode plate includes an identification mark defined within the active material layer.

2. An electrode plate for a secondary battery according to claim 1, wherein the identification mark is selected from the group consisting of a process schedule control mark, a manufacture lot number, a bar code, a cut mark and a position alignment mark.

3. An electrode plate for a secondary battery with a nonaqueous electrolyte comprising:

a collector;

an active material layer disposed on the collector, and the active imaterial layer includes an active material and a binder;

a terminal mounting portion having a collector surface exposed for mounting a terminal; and an identification mark defined by the active material layer disposed on the exposed collector surface.

4. An electrode plate for a secondary battery with a nonaqueous electrolyte comprising:

a collector;

an active material layer disposed on the collector, and the active material layer includes an active material and a binder;

a first exposed collector surface which defines a terminal mounting portion; and a second exposed collector surface which defines an identification mark.

5. An electrode plate for a secondary battery according to claim 4 wherein the identification mark is adjacent the terminal mounting portion.

6. An electrode plate for a secondary battery according to claim 3 wherein the identification mark is selected from the group consisting of a process schedule control mark, a manufacture lot number, a bar code, a cut mark, and a position alignment mark.

7. An electrode plate for a secondary battery according to claim 4 wherein the identification mark is selected from the group consisting of a process schedule control mark, a manufacture lot number, a bar code, a cut mark, and a position alignment mark.

* * * * *